(12) United States Patent
Saitou et al.

(10) Patent No.: US 9,272,650 B2
(45) Date of Patent: Mar. 1, 2016

(54) VEHICLE SEAT APPARATUSES

(71) Applicant: TOYOTA BOSHOKU KABUSHIKI KAISHA, Aichi-ken (JP)

(72) Inventors: Takao Saitou, Aichi-ken (JP); Teruya Kimura, Aichi-ken (JP); Kyousuke Il, Aichi-ken (JP); Yorihisa Inagaki, Aichi-ken (JP); Tomonori Yamaoka, Aichi-ken (JP); Jing Zhu, Shanghai (CN)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/095,064

(22) Filed: Dec. 3, 2013

(65) Prior Publication Data

US 2014/0159447 A1   Jun. 12, 2014

(30) Foreign Application Priority Data

Dec. 12, 2012 (JP) ................................. 2012-271051

(51) Int. Cl.
*B60N 2/70* (2006.01)
*B60R 16/02* (2006.01)
*B60N 2/44* (2006.01)

(52) U.S. Cl.
CPC .............. *B60N 2/70* (2013.01); *B60R 16/0215* (2013.01); *B60N 2002/4405* (2013.01)

(58) Field of Classification Search
CPC ............................... B60N 2/70; B60R 16/0215
USPC ........... 297/217.3, 218.1, 218.2, 218.3, 218.5
See application file for complete search history.

(56) References Cited

U.S. PATENT DOCUMENTS

| 4,558,905 A | * | 12/1985 | Natori ..................... 297/452.6 X |
| 4,927,209 A | * | 5/1990 | Maruyama ............... 297/180.12 |
| 6,375,269 B1 | * | 4/2002 | Maeda et al. ........... 297/218.2 X |
| 6,540,303 B2 | * | 4/2003 | Mosquera .................... 219/217 |
| 7,585,025 B2 | * | 9/2009 | Welch et al. ........... 297/218.2 X |
| 7,931,333 B2 | * | 4/2011 | Sung et al. ................. 297/217.2 |
| 2006/0137481 A1 | * | 6/2006 | Schmied et al. ........... 297/217.3 |
| 2008/0191526 A1 | * | 8/2008 | Orlewski et al. ....... 297/217.3 X |

FOREIGN PATENT DOCUMENTS

| CN | 201998937 | 10/2011 |
| JP | 61-109836 | 7/1986 |
| JP | 2-49650 | 4/1990 |
| JP | 2000-108810 | 4/2000 |

OTHER PUBLICATIONS

Chinese Office Action for CN App. No. 201310680775.3 dated Jul. 2, 2015, along with an English-language translation thereof.

* cited by examiner

*Primary Examiner* — Anthony D Barfield
(74) *Attorney, Agent, or Firm* — Greenblum & Berstein, P.L.C.

(57) ABSTRACT

Embodiments of the present invention may include a vehicle seat apparatus of a vehicle seat. The vehicle seat apparatus may have a seat pad, a plate member connected to the seat pad, and a linear member mounted to the plate member.

11 Claims, 6 Drawing Sheets

VEHICLE SEAT APPARATUSES

This application claims priority to Japanese patent application serial number 2012-271051, the contents of which are incorporated herein by reference.

BACKGROUND OF THE INVENTION

1. Field of the Invention

Embodiments of the present invention relate to vehicle seat apparatuses for mounting a linear member such as a wire harness to a vehicle seat.

2. Description of the Related Art

In a vehicle seat, there are clips for positioning a wire harness (See Japanese Laid-Open Utility Model Publication No. 2-49650). The clips are connected to a plurality of portions of the wire harness. Each clip is inserted into a pad of a seatback. As a result, the wire harness is mounted to and positioned relative to the seatback. However, when the occupant sits on the seat, the load of the occupant is applied to the seatback. Thereby, the pad of the seatback is deflected, making the clips subject to detachment.

Thus, there is a need in the art for a vehicle seat apparatus able to prevent a linear member such as a wire harness from being detached from the seat pad.

SUMMARY OF THE INVENTION

Certain embodiments of the present invention include a vehicle seat apparatus for a vehicle seat. The vehicle seat apparatus preferably has a seat pad, a plate member connected to the seat pad, and a linear member mounted to the plate member. Consequently, even when the seat pad is deflected, the plate member can retain the linear member. The linear member can be maintained in a state in which it is kept mounted to the seat pad by the plate member. Thus, the linear member is not easily detached from the seat pad.

According to another aspect of the invention, the vehicle seat apparatus may further include a planar member. The planar member may be provided on the seat pad to which the plate member is connected. Thus, the planar member can firmly retain the plate member on the seat pad along the surface of the seat pad.

According to still another aspect, the plate member may have a portion connected to the planar member so that the planar member supports the plate member in a cantilever-like fashion. As a result, the plate member is easily deflected. Further, the planar member supporting the plate member is likely to receive a bending load from the plate member and is easily deflected. Thus, the linear member can be flexibly mounted to the seat pad while being allowed to undergo positional deviation.

According to still another aspect, the vehicle seat apparatus may further include a clip for mounting the linear member to the plate member. The clip may have a binding portion configured to bundle the linear member, and a connection portion configured to be inserted into the plate member so as to be connected to the plate member. Thus, the linear member can be more easily mounted to the plate member. Moreover, the linear member is not easily detached from the plate member.

DETAILED DESCRIPTION OF THE INVENTION

Each of the additional features and teachings disclosed above and below may be utilized separately or in conjunction with other features and teachings to provide improved vehicle seats. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
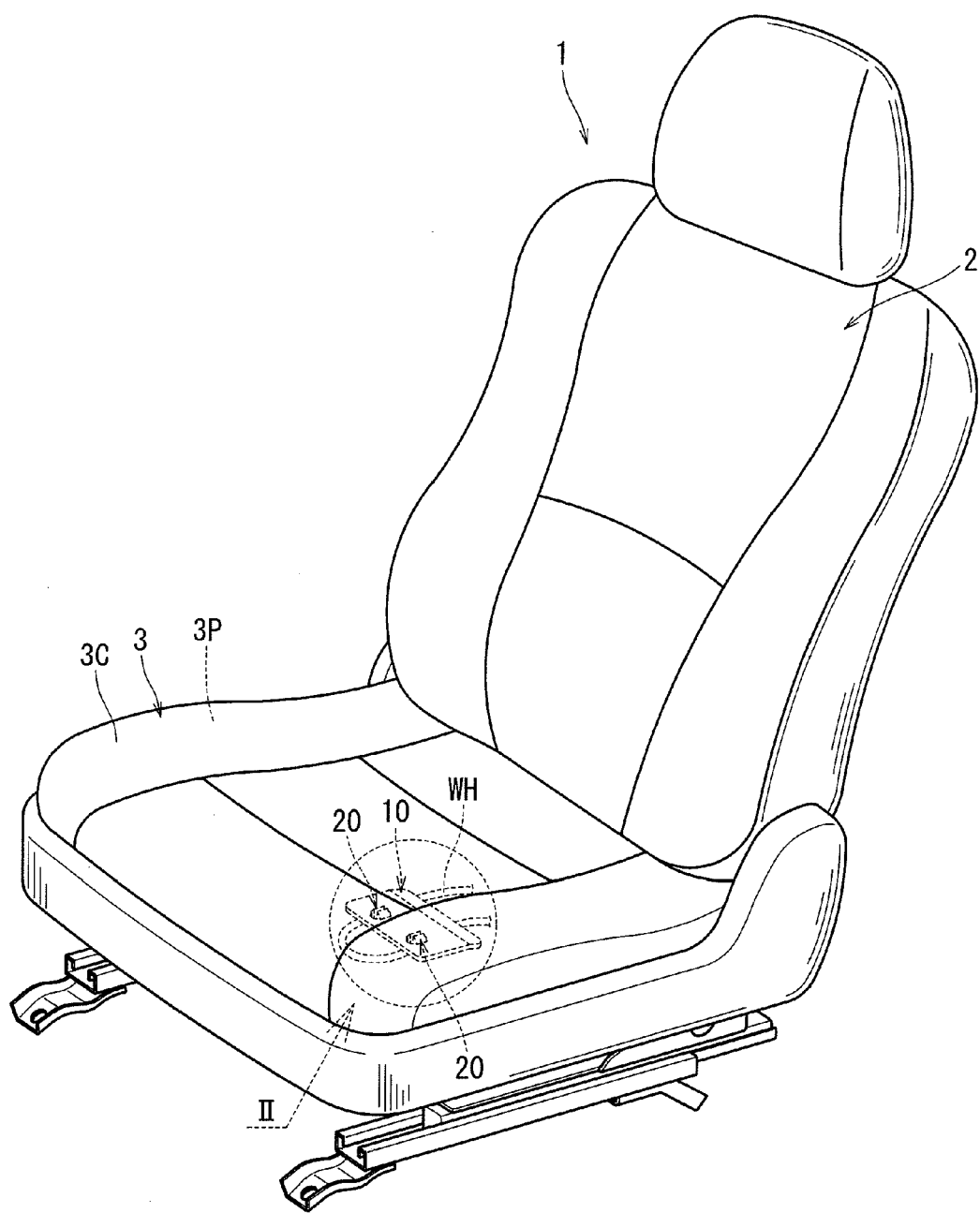
FIG. 1 is a perspective view of a vehicle seat.
Figure 2:
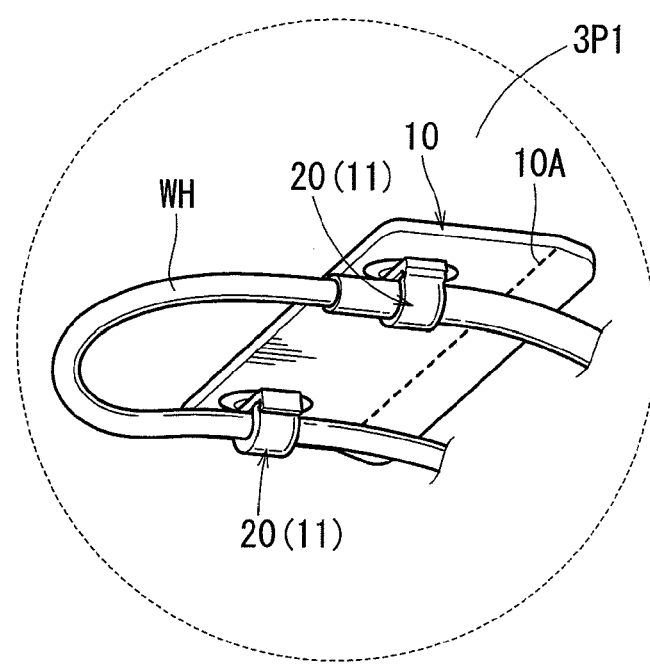
FIG. 2 is an enlarged view of a part symbolized II in FIG. 1.

An example of a vehicle seat apparatus for mounting a linear member to a vehicle seat will be described with reference to FIGS. 1 to 6. As shown in FIG. 1, a seat 1 consists of a driver's seat of an automobile, and may have a seatback 2, a seat cushion 3, and a wire harness (linear member) WH.

The seat cushion 3 has a cushion frame, a cushion pad 3P and a cushion cover 3C. The cushion frame is of a frame-like configuration, and constitutes the inner framework of the seat cushion 3. The cushion pad (seat pad) 3P is set on the cushion frame. The cushion pad 3P is formed of urethane foam or the like. The cushion pad 3P is a cushion member for elastically receiving a load of an occupant. The cushion cover 3C is formed of cloth or the like, and covers the entire upper surface of the cushion pad 3P.

Figure 3:
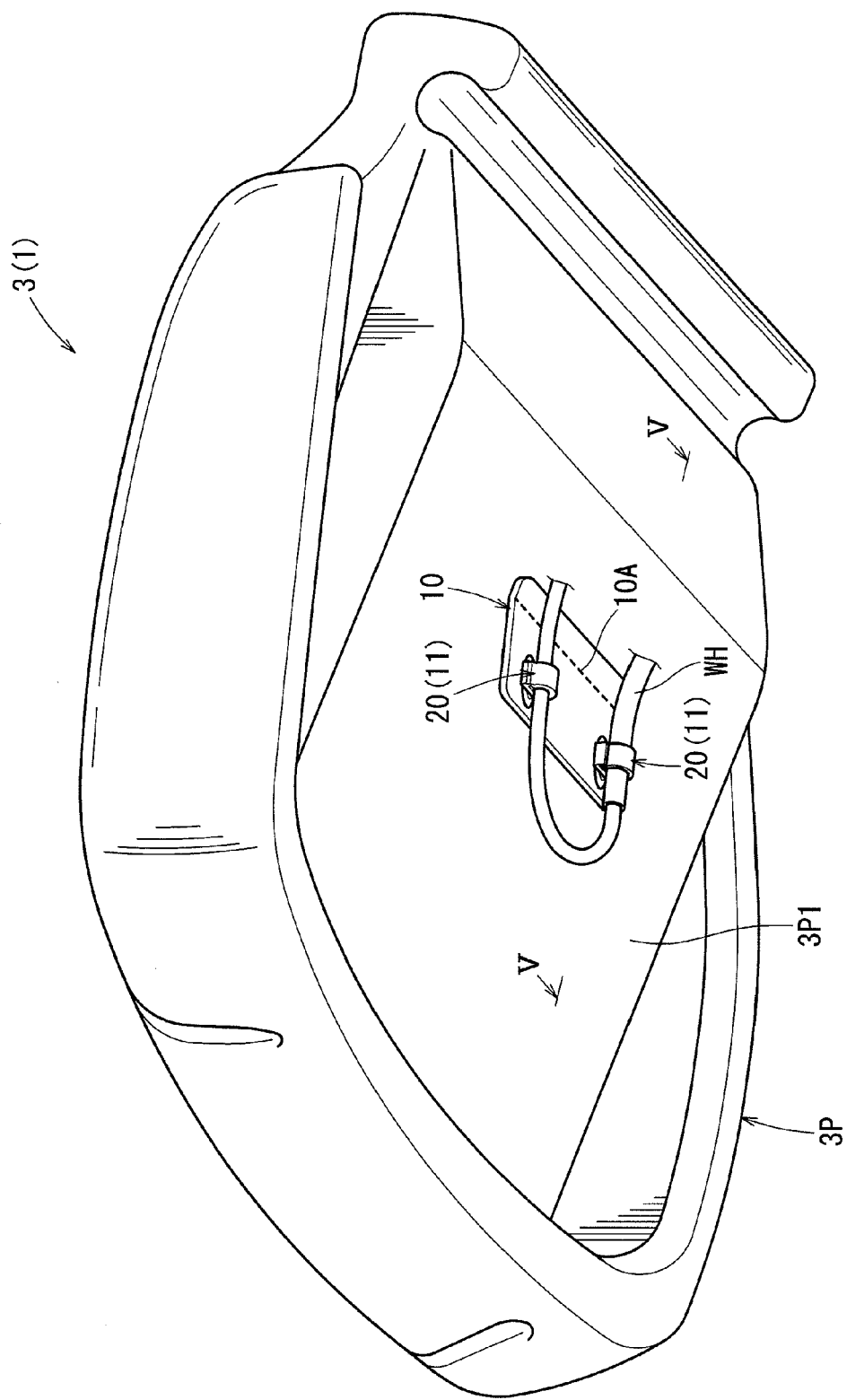
FIG. 3 is a perspective view of a seat cushion of the seat turned upside-down.
Figure 4:
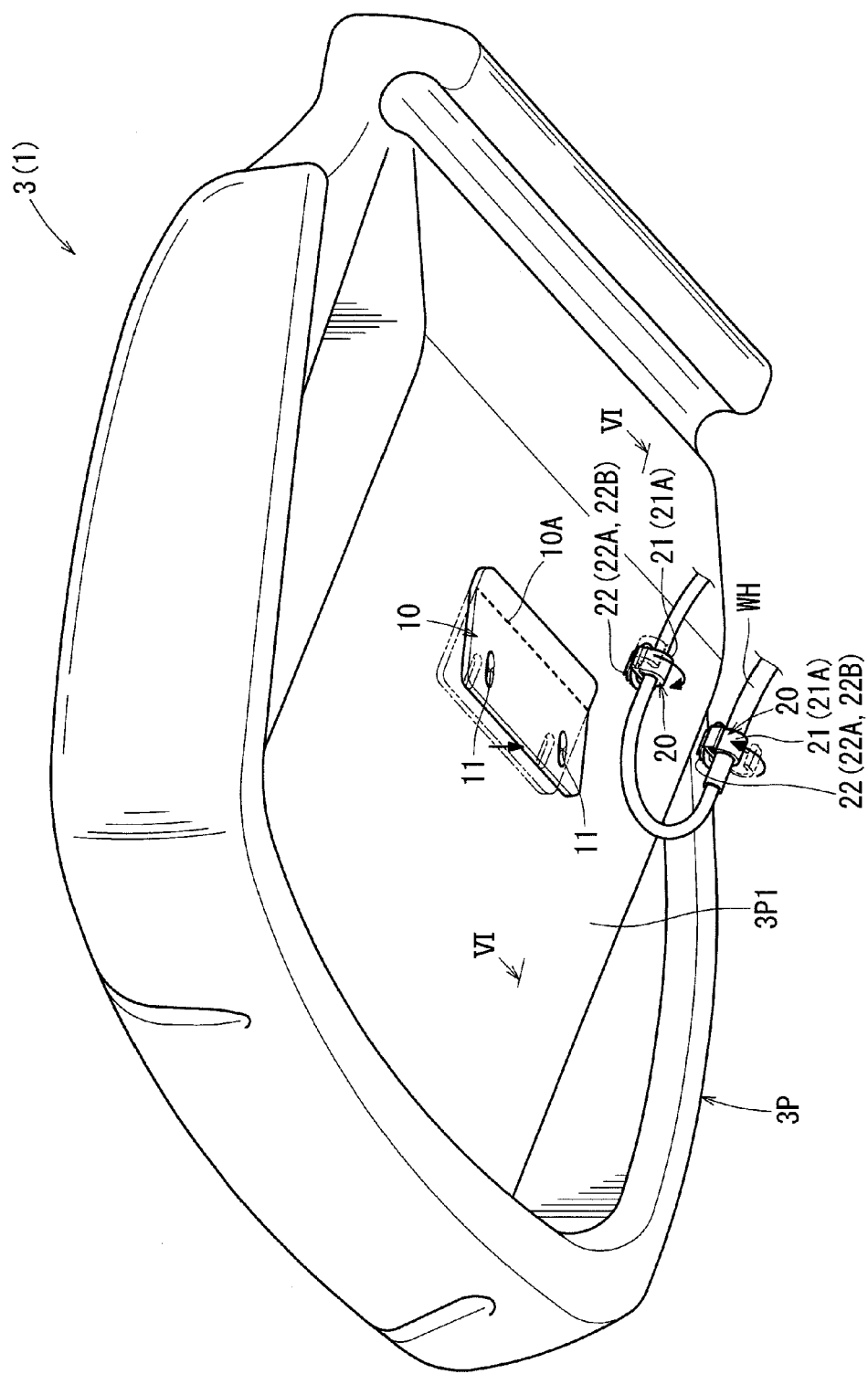
FIG. 4 is a perspective view of the seat cushion and a wire harness before the wire harness is mounted to the seat cushion.

As shown in FIGS. 3 and 4, a back or bottom surface member (planar member) 3P1 is provided on the back or bottom surface of the cushion pad 3P. The surface member 3P1 is formed of non-woven fabric or the like. The surface member 3P1 is integrated with the cushion pad 3 at the time of formation of the cushion pad 3P through foaming. The surface member 3P1 extends over the entire bottom area of the cushion pad 3P to enhance the strength of the bottom surface of the cushion pad 3P. The surface member 3P1 enhances the strength of the cushion pad 3P so that it can endure tension in an inward direction on the bottom surface of the cushion pad 3P. The surface member 3P1 functions as a reinforcing member. The surface member 3P1 can receive a load of the occupant and widely disperse the load in in-plane directions.

As shown in FIGS. 3 and 4, the wire harness WH is mounted to the bottom surface of the cushion pad 3P. The wire harness WH is arranged on the bottom or back or lower side of the seat cushion 3. The wire harness WH is connected to an electric apparatus such as a seat heater (not shown) arranged inside the seat cushion 3.

Figure 5:
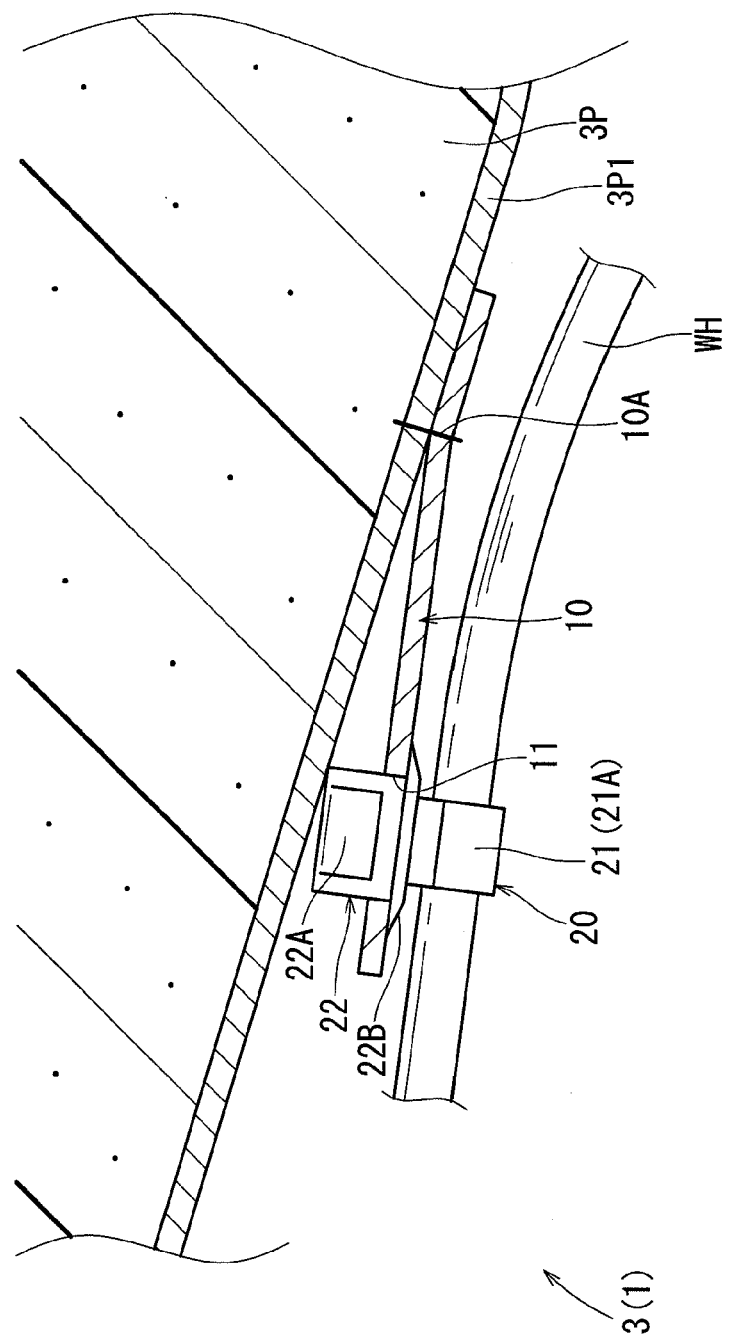
FIG. 5 is a cross-sectional view taken along line V-V in FIG. 3.

As shown in FIGS. 3 and 5, a plate member 10 for mounting the wire harness WH to the cushion pad 3P is integrally connected to the plate member 10. The plate member 10 is a resin plate member, and is of a rectangular configuration. The plate member 10 is provided at the center of the bottom surface of the cushion pad 3P. The plate member 10 is harder than the cushion pad 3P, but is flexible enough to allow an operator to deflect it through pressing with a finger. The rear portion of the plate member 10, in the vicinity of the rear edge thereof and extending along the rear edge thereof, is stitched to the cushion pad together with the surface member 3P1 (stitched portion 10A). The plate 10 is supported by the surface member 3P1 using the stitched portion 10A as the fulcrum.

Figure 6:
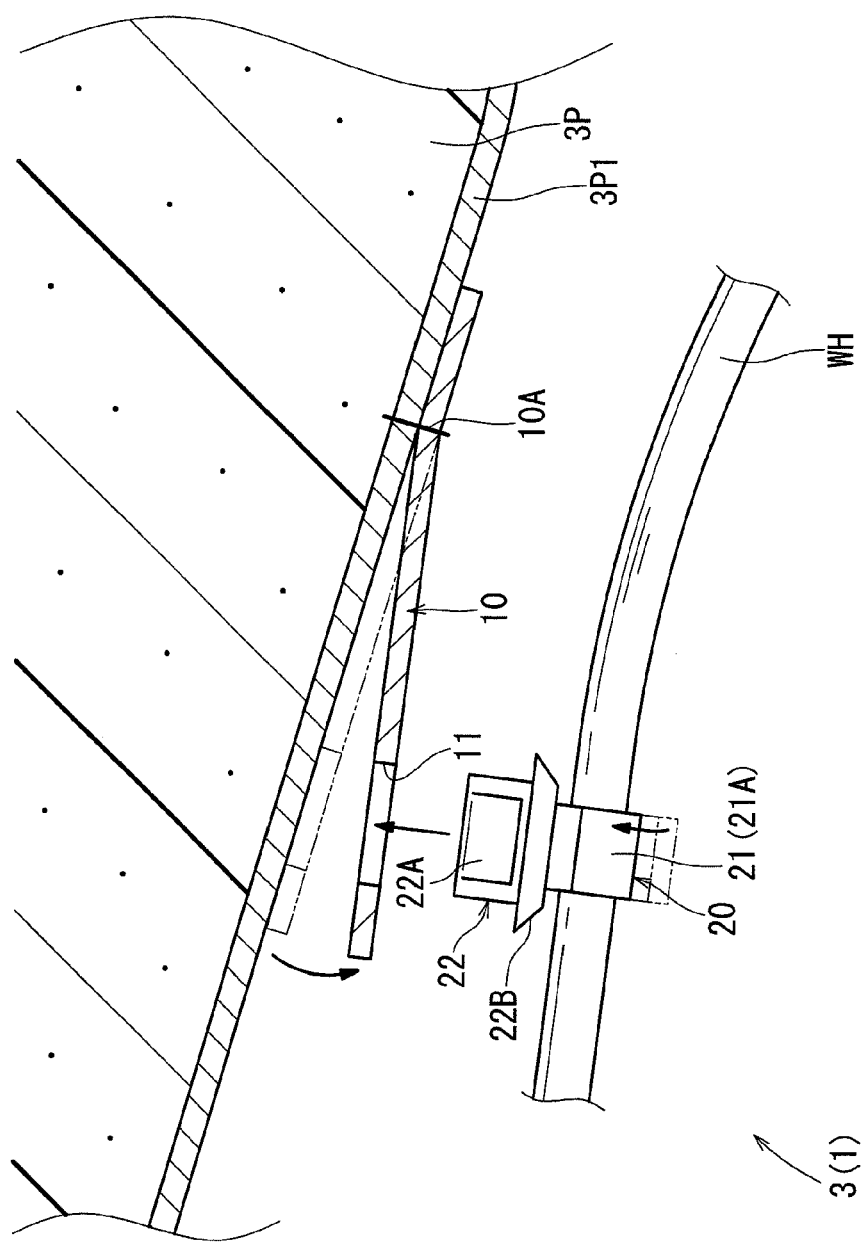
FIG. 6 is a cross-sectional view taken along line VI-VI in FIG. 4.

As shown in FIGS. 4 and 6, in a free state, a tip end of the plate member 10 abuts the surface member 3P1. Preferably, the entire plate member 10 is held in contact with the surface member 3P1 (initial position). The tip end of the plate member 10 may be raised with a finger, or the like, of the operator. The plate member 10 is deflected using the stitched portion 10A as the fulcrum. Because the plate member 10 is in a cantilever-like arrangement, the plate member 10 can easily receive a strong bending force at a portion in the vicinity of the stitched portion 10A. Thus, the plate member 10 is easily bent due to the bending force. By being bent, the plate member 10 is urged towards the initial position.

As shown in FIGS. 4 and 6, the plate member 10 has two elongated holes 11. The elongated holes 11 are elongated in a longitudinal direction of the seat cushion 3. The two elongated holes 11 are arranged side by side in the width direction of the seat. The two elongated holes 11 are situated in the vicinity of the left and right end edges of the plate member 10. The wire harness WH is provided with two clips 20. The clips 20 are respectively inserted into the elongated holes 11 from the bottom. As a result, the clips 20 are attached to the plate member 10, and the wire harness WH is retained on the bottom surface of the cushion pad 3P.

As shown in FIG. 4, the clips 20 are formed of resin. Each clip 20 may integrally have a binding portion 21 and a connection portion 22. Each binding portion 21 has a binding member 21A extending from the connection portion 22. The binding member 21A is connected to the connection portion 22 by an integral hinge. Thus the binding member 21A can be opened and closed through rotation around the integral hinge. The binding member 21A is opened so as to receive the wire harness WH, and is closed so as to bind the wire harness WH.

As shown in FIG. 4, the connection portions 22 may have a configuration corresponding to the elongated holes 11, e.g., a tubular configuration with an elliptical or oval cross-section. As shown in FIGS. 5 and 6, each connection portion 22 has engagement claws 22A and a stabilizer 22B. The engagement claws 22A are provided at two portions in the lateral direction of the outer peripheral surface of each connection portion 22. The engagement claws 22A protrude outwardly from the outer peripheral surface. The engagement claws 22A allow inward elastic deformation due to a cutout. When the connection portion 22 is inserted into the elongated hole 11, the elastic deformation occurs until the engagement claws 22A go beyond the elongated hole 11. When the engagement claws 22A pass through the elongated hole 11, the engagement claws 22A are opened radially outwards due to elastic restoration. Thus, the engagement claws 22A engage with the peripheral edge portion of the elongated hole 11. As a result, detachment of each connection portion 22 from the plate member 10 is prevented.

As shown in FIGS. 5 and 6, each stabilizer 22B extends radially outwards from a distal end of the connection portion 22. The stabilizer 22B is of a lamp-shade-like configuration; the farther from the connection portion 22, the thinner the stabilizer 22B. When the connection portion 22 is inserted into the elongated hole 11, the stabilizer 22B abuts the plate member 10. When the connection member 22 is further inserted, the connection portion 22 undergoes elastic deformation so as to generate a resilient force in a direction opposite the inserting direction. As a result, the stabilizer 22B urges the connection portion 22 so as to cause the engagement claws 22A to be engaged with the peripheral edge portion of the elongated hole 11. Thus, the resilient force of the stabilizer 22B can prevent rattling of the connection portion 22 in both the inserting direction and extracting direction with respect to the plate member 10.

As shown in FIG. 5, each connection portion 22 elastically holds the plate member 10 by virtue of the stabilizer 22B and the engagement claws 22A. In this way, it is also possible to prevent radial rattling of the connection portion 22 with respect to the plate member 10. The connection portion 22 has a configuration in conformity with the elongated hole 11. Using such a configuration, a rotation of the connection portion 22 within the elongated hole 11 can also be prevented. The connection portion 22 passes through the plate member 10 and is situated between the plate member 10 and the cushion pad 3P. The connection portion 22 deforms the plate member 10 whereby the plate member 10 is raised from the cushion pad 3P. The plate member 10, which is supported in a cantilever-like fashion, can flexibly undergo deformation, so that large loads are not applied to the clips 20 or the cushion pad 3P.

As shown in FIGS. 1 to 4, the portion of the wire harness WH mounted to the plate member 10 has a U-shaped bent portion. The clips 20 are respectively attached to both ends of the bent portion, and the clips 20 are mounted to the plate member 10. As a result, the wire harness WH is bent into a U-shape to generate a resilient force. The resilient force of the wire harness WH presses the clips 20 against the edge portions of the elongated holes 11. In this way, the resilient force of the wire harness WH may suppress the clips 20 from rattling with respect to the elongated holes 11. Thus, the wire harness WH can be mounted to the plate member 10 in a more secure manner.

As shown in FIG. 1, of the above-described vehicle seat apparatus, the wire harness WH is mounted to the plate member 10. The plate member 10 may be further attached to the cushion pad 3P. Thus, even if the load of the occupant deflects the cushion pad 3P, the plate member 10 may continue to retain the wire harness WH. In this way, the wire harness WH is not easily detached from the cushion pad 3P.

As shown in FIG. 3, the plate member 10 is connected to the surface member 3P1. The surface member 3P1 allows the plate member 10 to be arranged along the bottom surface of the cushion pad 3P. In this way, the surface member 3P1 suppresses the plate member 10 from being away from the bottom surface. The plate member 10 is connected to the surface member 3P1 in a cantilever-like fashion. By using such a connection, the plate member 10 is easily deflected. Further, the surface member 3P1 supporting the plate member 10 receives a load from the plate member 10, and is likely to be deflected. As a result, it is possible to flexibly absorb any positional deviation of the wire harness WH with respect to the cushion pad 3P.

As shown in FIG. 4, the clips 20 are inserted into and mounted to the plate member 10. As a result, the wire harness WH is easily mounted to the plate member 10 by the clips 20, and is prevented from being detached from the plate member 10.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

As described above, the vehicle seat may be the driver's seat of an automobile. Alternatively, the vehicle seat may be a vehicle seat other than the driver's seat of an automobile, or a vehicle seat for a railroad car and the like. Alternatively, the vehicle seat may be one for various vehicles such as an airplane or a ship.

As described above, the linear member may be attached to the seat pad of the seatback. Alternatively, the linear member may be attached to some other seat component such as the seat cushion or the headrest. As described above, the linear member may be a wire harness. Alternatively, the linear member may be one of various kinds of cables or a wire. The linear member may also be directly mounted to the plate member without using any clips. For example, a hole and a slit are formed in the plate member. The slit extends between the hole and the peripheral edge portion of the plate member. The linear member is insert into the hole via the slit. The linear member may then be mounted to the plate member.

As described above, the planar member may be integrated with the seat pad. Alternatively, the planar member may be attached to the surface (bottom, side or back surface, etc.) of the seat pad. As described above, the planar member may be provided on the entire bottom surface of the seat pad. Alternatively, the planar member may be provided on only a part of the surface of the seat pad. As described above, the planar member may be provided in order to reinforce the seat pad. Alternatively, the planar member may be provided in order to prevent the seat pad from contacting the seat frame. This helps to suppress scraping of the seat pad and/or the generation of noise.

This invention claims:

1. A vehicle seat apparatus comprising:
  a seat pad;
  a plate member connected to the seat pad;
  a linear member mounted to the plate member;
  a planar member provided on the seat pad such that the planar member is connected to the plate member; and
  a clip for mounting the linear member to the plate member, the clip comprising:
    a binding portion configured to bundle the linear member; and
    a connection portion configured to be inserted into a mounting portion of the plate member in order to be connected to the plate member, wherein
  the mounting portion of the plate member is provided outside of the seat pad,
  the plate member is connected to the planar member so that the planar member supports the plate member in a cantilever-like fashion,
  the planar member covers the seat pad,
  the plate member is connected to the planar member at a side opposite to the seat pad such that the plate member covers the planar member, and
  the plate member has a base portion connected to the planar member and a tip portion, and the base portion is configured as a fulcrum such that the tip portion of the plate member is configured to be capable of moving away from the planar member.

2. The vehicle seat apparatus of claim 1, wherein
  the planar member is provided under the seat pad, and
  the plate member extends substantially parallel to the planar member.

3. The vehicle seat apparatus of claim 2, wherein the plate member is connected to the planar member such that the plate member contacts the planar member when the linear member is detached from the plate member.

4. The vehicle seat apparatus of claim 1, wherein the connection portion of the clip is provided between the planar member and the plate member such that the plate member is spaced from the planar member.

5. The vehicle seat apparatus of claim 1, wherein the base portion is a rear portion of the plate member that is attached to the planar member so that the planar member supports the plate member in the cantilever-like fashion.

6. The vehicle seat apparatus of claim 5, wherein the rear portion of the plate member is the fulcrum that allows the tip end of the plate member to pivot toward and away from the planar member in the cantilever-like fashion.

7. The vehicle seat apparatus of claim 6, wherein the rear portion and the tip end are provided on opposite sides of the plate member.

8. The vehicle seat apparatus of claim 1, wherein the tip end of the plate member is deflectable from the planar member in the cantilever-like fashion.

9. The vehicle seat apparatus of claim 8, wherein the tip end of the plate member is in a free state so as to be deflectable from the planar member in the cantilever-like fashion.

10. The vehicle seat apparatus of claim 1, wherein the plate member is connected to the planar member such that the plate member is deflectable from the seat pad.

11. The vehicle seat apparatus of claim 1, wherein
  the tip portion is configured to be capable of moving away from the planar member by deflection of the plate member while the base portion is the fulcrum, and
  the clip is mounted on the tip portion of the plate member.

* * * * *